US012623944B2

(12) United States Patent
Cao et al.

(10) Patent No.: US 12,623,944 B2
(45) Date of Patent: May 12, 2026

(54) ROTARY FIRING DEVICE, FURNACE AND ROTARY FIRING METHOD THEREOF

(71) Applicant: JUSHI GROUP CO., LTD., Tongxiang City (CN)

(72) Inventors: Guorong Cao, Tongxiang City (CN); Peijun Shen, Tongxiang City (CN); Haijun Wang, Tongxiang City (CN); Changying Fang, Tongxiang City (CN); Ligen Qian, Tongxiang City (CN)

(73) Assignee: JUSHI GROUP CO., LTD., Tongxiang City (CN)

( * ) Notice: Subject to any disclaimer, the term of this patent is extended or adjusted under 35 U.S.C. 154(b) by 495 days.

(21) Appl. No.: 17/995,123

(22) PCT Filed: Jul. 12, 2021

(86) PCT No.: PCT/CN2021/105692
§ 371 (c)(1),
(2) Date: Sep. 30, 2022

(87) PCT Pub. No.: WO2023/279410
PCT Pub. Date: Jan. 12, 2023

(65) Prior Publication Data
US 2023/0219836 A1 Jul. 13, 2023

(30) Foreign Application Priority Data

Jul. 5, 2021 (CN) .......................... 202110757321.6

(51) Int. Cl.
*C03B 5/24* (2006.01)
*B25J 9/16* (2006.01)
(Continued)

(52) U.S. Cl.
CPC ............... *C03B 5/24* (2013.01); *B25J 9/1697* (2013.01); *C03B 5/2353* (2013.01); *F23C 5/06* (2013.01);
(Continued)

(58) Field of Classification Search
CPC ....... B25J 9/1679; B25J 9/1697; C03B 5/235; C03B 5/2353; C03B 5/24; C03B 2211/40;
(Continued)

(56) References Cited

U.S. PATENT DOCUMENTS

| 3,129,930 A | 4/1964 | Labat-Camy |
| 2012/0137737 A1* | 6/2012 | Sakamoto ............... C03B 5/025 |
| | | 373/41 |

(Continued)

FOREIGN PATENT DOCUMENTS

| CN | 102482131 A | 5/2012 |
| CN | 202582166 U | 12/2012 |

(Continued)

OTHER PUBLICATIONS

WO 03049500 A2—Translation (Year: 2003).*

(Continued)

*Primary Examiner* — Steven B McAllister
*Assistant Examiner* — Benjamin W Johnson
(74) *Attorney, Agent, or Firm* — COOPER LEGAL GROUP LLC

(57) ABSTRACT

The present disclosure provides a rotary firing device, furnace and rotary firing method thereof. The rotary firing device is arranged on the roof of the furnace and includes an installation base, an adjusting arm and a tubular burner. The installation base and the adjusting arm are fixed on the roof of the furnace, the middle portion of the tubular burner is rotationally connected to the installation base, and the output end of the tubular burner is located inside the furnace. The (Continued)

output end of the adjusting arm is connected to the middle portion of the tubular burner.

9 Claims, 3 Drawing Sheets

(51) Int. Cl.
  *C03B 5/235* (2006.01)
  *F23C 5/06* (2006.01)
  *F23L 7/00* (2006.01)
  *F27B 14/14* (2006.01)
(52) U.S. Cl.
  CPC ............. *B25J 9/1679* (2013.01); *C03B 5/235* (2013.01); *C03B 2211/40* (2013.01); *F23L 7/007* (2013.01); *F27B 14/143* (2013.01); *Y02E 20/34* (2013.01); *Y02P 40/50* (2015.11)
(58) Field of Classification Search
  CPC ........... F23C 5/06; F23L 7/007; F27B 14/143; Y02E 20/34; Y02P 40/50
  USPC ......................................................... 431/189
  See application file for complete search history.

(56) References Cited

U.S. PATENT DOCUMENTS

| | | | | |
|---|---|---|---|---|
| 2012/0216568 A1* | 8/2012 | Fisher, Jr. | ................. | C03B 5/24 |
| | | | | 65/29.21 |
| 2012/0324951 A1 | 12/2012 | Tsiava | | |
| 2017/0015579 A1* | 1/2017 | Charbonneau | .......... | F23D 14/22 |
| 2019/0031548 A1* | 1/2019 | Nabors, Jr. | ........... | C03B 5/2353 |
| 2019/0322562 A1 | 10/2019 | Turner et al. | | |
| 2020/0300455 A1* | 9/2020 | Sorg | ........................ | C03B 5/235 |

FOREIGN PATENT DOCUMENTS

| | | | | |
|---|---|---|---|---|
| CN | 106746501 A | 5/2017 | | |
| CN | 109896726 A | 6/2019 | | |
| CN | 112033177 A | 12/2020 | | |
| CN | 113063616 A | 7/2021 | | |
| GB | 881432 A | 11/1961 | | |
| WO | WO-03049500 A2 * | 6/2003 | ............. | H05B 3/265 |

OTHER PUBLICATIONS

First Office Action cited in CN202110757321.6 mailed Jan. 25, 2022, 20 pages.
International Search Report cited in PCT/CN2021/105692 mailed Mar. 29, 2022, 10 pages.
EP Search Report cited in EP 21933483.6, mailed Sep. 19, 2024, 9 pages.

* cited by examiner

43

ROTARY FIRING DEVICE, FURNACE AND ROTARY FIRING METHOD THEREOF

CROSS-REFERENCE TO RELATED APPLICATIONS

The present disclosure is a national stage entry under 35 U.S.C. § 371 of International Application No. PCT/CN2021/105692, filed on Jul. 12, 2021, which claims priority to Chinese Patent Application No. 202110757321.6, filed on Jul. 5, 2021 and entitled "Rotary Firing Device, Furnace and Rotary Firing Method Thereof". International Application No. PCT/CN2021/105692 and Chinese Patent Application No. 202110757321.6 are incorporated herein by reference in their entireties.

TECHNICAL FIELD

The present disclosure relates to but is not limited to a rotary firing device, furnace and rotary firing method thereof.

BACKGROUND

In the process of melting the glass, the oxy-fuel roof firing technology is steadily used on larger scales, as it offers complete combustion and high- temperature flame, bringing many advantages such as significantly reduced NOx emissions, stable process, energy consumption saving, product quality improvement, and overall benefit increase. Practice shows that the structural arrangement of the firing device plays a key role in oxy-fuel roof firing technology. A rational arrangement of the firing device would be a guarantee for effective flame coverage over the glass level, thus improving the melting quality of glass, stabilizing the glass batch line, and reducing the occurrence of phenomenon of batch material escaping from being fired.

Glass fiber manufacturers attach importance to the arrangement and design of oxy-fuel firing devices. In the prior art, a plurality of firing devices are arranged on the crown of a furnace. The efficiency and quality of glass meting are improved thanks to the many firing devices installed. However, as the firing devices are fixed on the crown, a phenomenon of batch material escaping from being fired and an unstable glass batch line would easily occur, as shown in FIG. 1, when the feed of glass batch or the flow of molten glass is increased. In that case, some of the batch would flow with the molten glass inside the furnace at the upper part of the glass liquid that corresponds to regions between adjacent firing devices, thereby forming "strips" of unmelted batch as designated by A in FIG. 1 and causing incomplete melting of the batch. Restricted by the furnace structure and process arrangement, it is difficult to solve the above problems by adding more firing devices. And if the flow of the firing device is increased to enforce the melting, the problem of "strips" of unmelted batch as mentioned above would still not be solved effectively, for the effective flame coverage has not been increased. Further, an increased flow of firing device would impinge on the batch and the glass level and thus cause a phenomenon of flying powders of the batch. Still, the temperature of certain locations in the high-temperature melting zone would increase, which leads to drastic change of temperature in some locations inside the furnace, causing thermal shock and affecting the furnace structure.

SUMMARY

The following is a summary of the subject matter described in detail in the present disclosure. The summary is not intended to limit the protection scope of claims of this disclosure.

The present disclosure provides a rotary firing device, furnace and rotary firing method thereof, which can increase the flame coverage.

According to a first aspect of the present disclosure relates to a rotary firing device. The rotary firing device is arranged on a roof of a furnace and includes an installation base, an adjusting arm and a tubular burner. Wherein, the installation base and the adjusting arm are fixed on the roof of the furnace, a middle portion of the tubular burner is rotationally connected to the installation base, and an output end of the tubular burner is located inside the furnace; and wherein an output end of the adjusting arm is connected to the middle portion of the tubular burner.

According to some embodiments of the present disclosure, the rotary firing device further includes a joint bearing embedded in the installation base. The middle portion of the tubular burner is connected to the installation base through the joint bearing.

According to some embodiments of the present disclosure, the adjusting arm drives the tubular burner to rotate or sway within a preset angle range.

According to some embodiments of the present disclosure, the preset angle range is a range having an upper limit central angle of 90°.

According to some embodiments of the present disclosure, the adjusting arm is a multi-joint 6 DOF robotic arm.

According to a second aspect of the present disclosure relates to a furnace which includes a crown, a wall and at least one set of the rotary firing device described above. An edge of the crown is fixed to a top of the wall. The rotary firing device is arranged on the crown, and an output end of the tubular burner is located below the crown.

According to some embodiments of the present disclosure, the furnace further includes an industrial imaging system for capturing real-time image data inside the furnace.

According to some embodiments of the present disclosure, the industrial imaging system includes an industrial imaging device, an image transmission device, and an industrial computer. The industrial imaging device is set on the crown or on the wall. An image acquisition end of the industrial imaging device is arranged to face a glass level and/or the wall inside the furnace, and an output end of the industrial imaging device is electrically connected to the image transmission device. An output end of the image transmission device is signally connected to the industrial computer.

According to some embodiments of the present disclosure, the industrial imaging device is a high-temperature resistant industrial camera or a thermal imager.

According to some embodiments of the present disclosure, an output end of the industrial computer is signally connected to the adjusting arm.

According to some embodiments of the present disclosure, the industrial computer includes an image processing module, a storage module, an image comparison module, a drive module and a display module. An input end of the image processing module is signally connected to an output end of the image transmission device, an output end of the image processing module is signally connected to the storage module and the image comparison module, and an output end of the image comparison module is signally connected to the drive module and the display module.

According to a third aspect of the present disclosure relates to a rotary firing method of a furnace, and the rotary firing method is achieved by using the furnace as described above.

The rotary firing device in the embodiments of the present disclosure utilizes the adjusting arm and the joint bearing to achieve the adjustment for rotating or swaying the tubular burner, thus enabling a dynamic heating of batch material inside the furnace and increasing the flame coverage of a single tubular burner. By controlling and adjusting the rotation cycle and rotation angle of the tubular burner, the batch material is melted more reasonably, more efficiently and at a high rate, the heat utilization efficiency is increased, and a targeted combustion may be specifically directed toward part of batch material which is hard to melt, as well as toward lump material and/or material escaping from being fired. Therefore, the batch line is effectively stabilized, the melting quality of the furnace is guaranteed, and the melting rate of the furnace is significantly increased. In addition, a heating method achievable by rotating the tubular burner may decrease the threshold space temperature and the hot spot temperature in the high-temperature melting zone, avoiding the impact on the furnace structure caused by excessively high temperature at some locations in the flame space, and thus help guarantee safe operation and service life of the furnace.

Other aspects of this disclosure will become clear after reading and comprehending the drawings and detailed description as follows.

BRIEF DESCRIPTION OF THE DRAWINGS

The drawings incorporated in the description and constituting a part of the description show the embodiments of the present disclosure, and are used for explaining the principle of the embodiments in combination with the description. In these drawings, similar reference numerals represent similar elements. The drawings described hereinafter are some but not all of the embodiments of the present disclosure. A person of ordinary skill in the art can obtain other drawings based on these drawings without paying creative effort.

DESIGNATION 1. rotary firing device; 11. installation base; 12. adjusting arm; 13. tubular burner; 14. joint bearing; 2. crown; 3. wall; 4. industrial imaging system; 41. industrial imaging device; 42. image transmission device; 43. industrial computer; 431.

image processing module; 432. storage module; 433. image comparison module; 434. drive module; 435. display module

DETAILED DESCRIPTION

The technical solutions in the present disclosure are described clearly and completely as follows with reference to the accompanying drawings in the embodiments of the present disclosure. Apparently, the described embodiments are some rather than all of the examples of the present disclosure. All other embodiments obtained by those of ordinary skill in the art based on the embodiments of the present disclosure without creative effort should fall within the protection scope of the present disclosure. It should be noted that without conflict, the embodiments in this disclosure and features in the embodiments may be combined with each other.

The rotary firing device according to the present disclosure enables a dynamic firing of glass batch material inside the furnace. A multi-DOF adjusting arm is used for quick, efficient and wide-range adjustment in rotating or swaying a tubular burner. The adjustment could be made within a maximally large range in a relatively small space on the roof of the furnace. In this way, an efficient combustion as well as a dynamic heating of the batch material and molten glass inside the furnace is achieved, the flame coverage over the glass level by a single burner is increased, and the heat utilization efficiency of the furnace is improved. Meanwhile, the threshold space temperature and the hot spot temperature in the high-temperature melting zone of the furnace is decreased, and the impact on the furnace structure by excessively high temperature at some locations in the flame space is avoided, hence helping guarantee safe and stable operation and the service life of the furnace. In addition, a targeted combustion may be specifically directed toward part of batch material which is hard to melt, as well as toward lump material and/or material escaping from being fired, so that the batch line inside the furnace is effectively stabilized and the melting quality of molten glass is guaranteed.

The rotary firing device, furnace and rotary firing method thereof according to the present disclosure is described below in detail with reference to the accompanying drawings.

Figure 1:
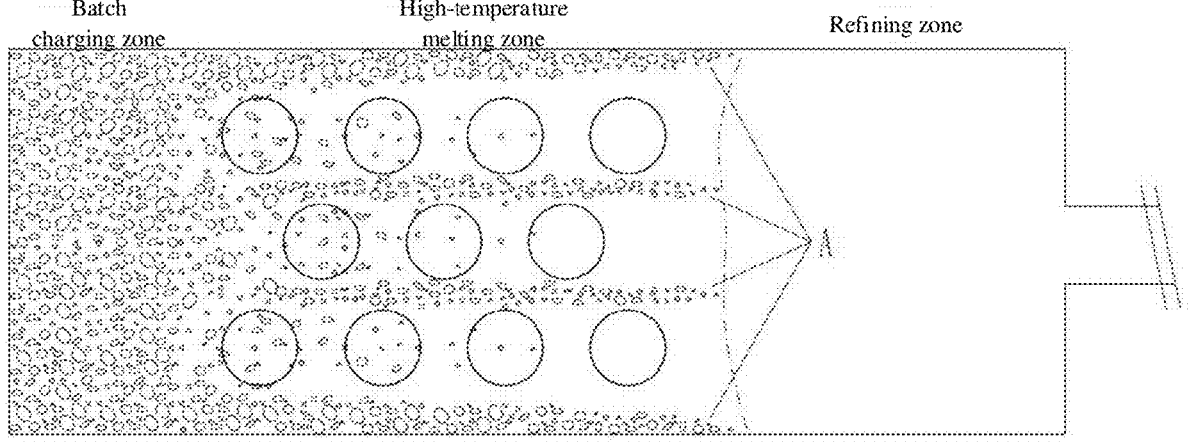
FIG. 1 exemplarily shows a schematic diagram of an arrangement of a burner in a furnace according to the prior art.
Figure 2:
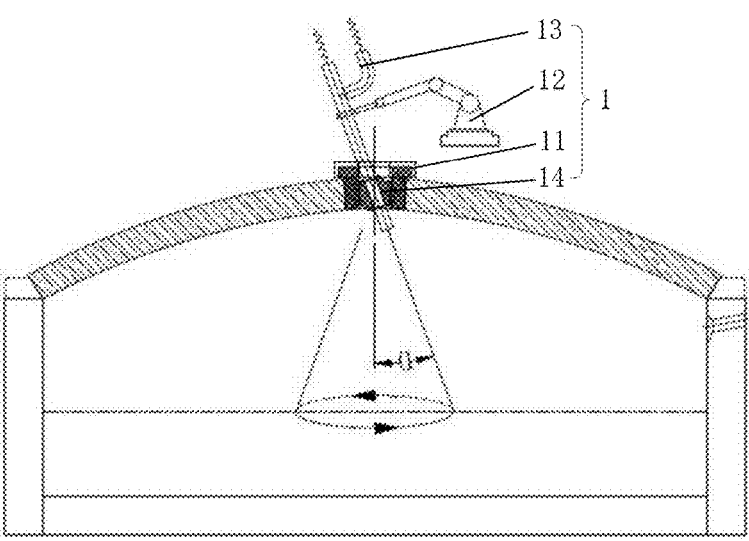
FIG. 2 exemplarily shows a schematic diagram of usage of a rotary firing device according to the present disclosure.
Figure 3:
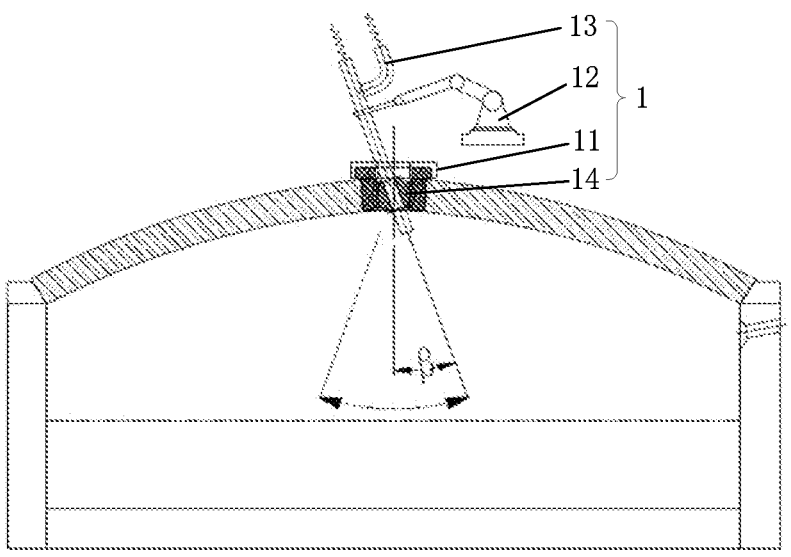
FIG. 3 exemplarily shows a schematic diagram of another usage of a rotary firing device according to the present disclosure.

FIG. 2 and FIG. 3 each shows a schematic diagram of a usage of a rotary firing device 1 according to the present disclosure. With reference to FIG. 2 and FIG. 3, the rotary firing device 1 is arranged on the roof of a furnace and includes an installation base 11, an adjusting arm 12 and a tubular burner 13. The installation base 11 and the adjusting arm 12 are fixed on the roof of the furnace, and the adjusting arm 12 is arranged at a preset distance from the installation base 11. The middle portion of the tubular burner 13 is rotationally connected to the installation base 11, and the output end of the tubular burner 13 is located inside the furnace. The output end of the adjusting arm 12 is connected to the middle portion of the tubular burner 13, and the connection joint of the adjusting arm 12 and the tubular burner 13 is located at a preset height above the installation base 11. The adjusting arm 12 drives the tubular burner 13 to rotate (as shown in FIG. 2) or sway (as shown in FIG. 3), enabling the output end of the tubular burner 13 to rotate or sway within a certain range inside the furnace. Hence a dynamic heating is achieved, the flame coverage is increased, and the occurrence of phenomenon of materials escaping from being fired is minimized. In addition, a targeted combustion may be specifically directed toward part of batch material which is hard to melt, as well as toward lump material and/or material escaping from being fired, further improving the melting efficiency and quality.

In an optional embodiment of the present disclosure, the rotary firing device 1 further includes a joint bearing 14. The joint bearing 14 is embedded in the installation base 11. The middle portion of the tubular burner 13 is connected to the installation base 11 through the joint bearing 14. A spherical bearing may be used as the joint bearing, as it has a spherical sliding structure that offers high load capacity, impact resistance and wear resistance, and can automatically adjust itself to be centrally aligned. So the tubular burner 13 would be capable of rotating or swaying more flexibly and more smoothly, which is conducive to timely adjusting the range of rotation or sway of the tubular burner 13 based on requirement, and in implementing the adjustment, only the output of the adjusting arm 12 needs to be adaptively adjusted.

In a solution according to the present disclosure, the adjusting arm 12 drives the tubular burner 13 to rotate or sway within a preset angle range. That is, driven by the adjusting arm 12, the tubular burner 13 may rotate conically (as shown in FIG. 2) or sway to and fro (as shown in FIG. 3) relative to the vertical direction. In other words, the movement trajectory of the tubular burner 13 may form either a cone within a preset angle range, or a sector within a preset angle range on a vertical plane. Compared with a fixedly installed burner in the prior art, the flame coverage area of the tubular burner 13 according to the present solution is significantly increased, by several times at least, such that a large-area melting and heating of the glass batch material and molten glass inside the furnace is achieved, the melting effect of molten glass is significantly improved, and a phenomenon of "strips" of materials escaping from being fired is effectively avoided.

In some embodiments, the preset angle range for the rotation or sway of the tubular burner 13 is within 90° of the central angle, that is, the tubular burner 13 rotates or sways in an angle range from 0 to 45° relative to the vertical direction. To put it another way, driven by the adjusting arm 12, an included angle (designated as α in FIG. 2, or β in FIG. 3) between the tubular burner 13 being at the maximum height of its rotation or sway and the tubular burner 13 being in the vertical direction is in a range of 0 to 45°; and in some optional embodiments, driven by the adjusting arm 12, the included angle may be 15°, 30° or 36°, etc.

In an optional embodiment, the adjusting arm 12 may be a lightweight multi-joint 6 DOF robotic arm, which has the characteristics of precision control, smart operation and a large operation range, and enables rapid, efficient and wide-range movement adjustment for the tubular burner 13 within a small space on the roof of the furnace.

In an optional embodiment, the drive motor of the adjusting arm 12 is a cylinder driver or a hydraulic drive motor. Under the telescopic drive by the cylinder push rod of the cylinder driver or by the hydraulic rod of the hydraulic drive motor, the tubular burner 13 makes a pendulum movement within a range of 0 to 45° of the angle β relative to the vertical direction perpendicular to the flow of molten glass (as shown in FIG. 3), or rotates conically within a range of 0 to 45° of half conical angle α (as shown in FIG. 2).

Figure 4:
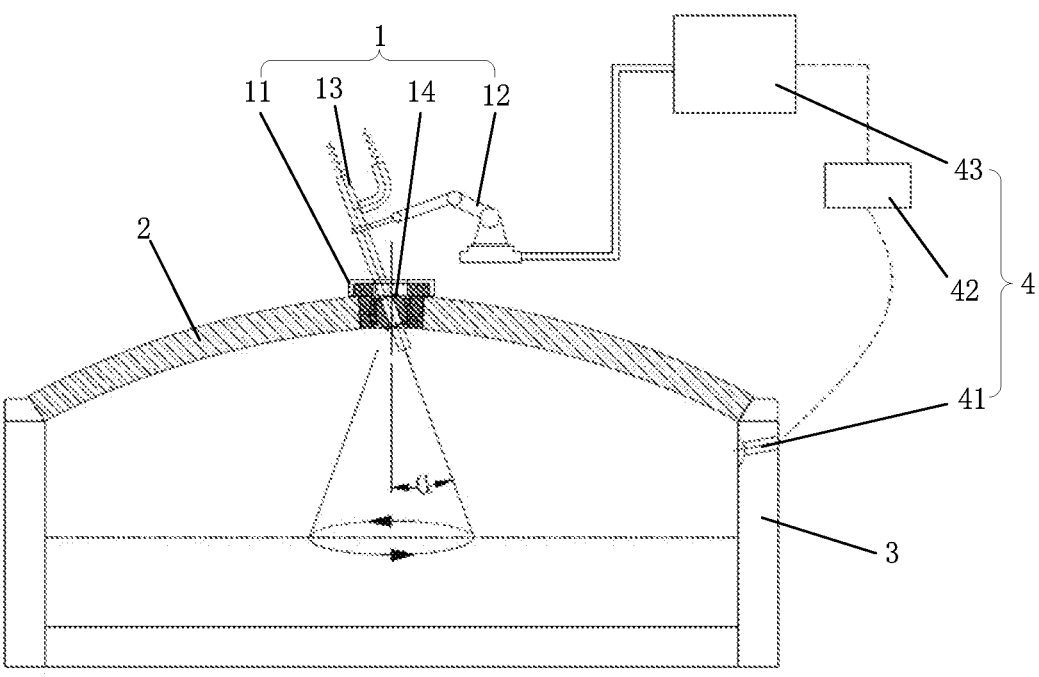
FIG. 4 exemplarily shows a schematic structural diagram of a furnace according to the present disclosure.

The present disclosure further provides a furnace that matches the above rotary firing device. FIG. 4 shows a structural diagram of the furnace. With reference to FIG. 4, the furnace includes a crown 2, a wall 3, and at least one set of the rotary firing device 1 as described above. The wall 3 includes a left side wall and a breast wall of the left side wall, a right side wall and a breast wall of the right side wall, a front end wall and a back end wall. An edge of the crown 2 is fixedly connected to the top of the wall 3, the crown 2 spans the roof of the furnace, and the two sides of the crown 2 are fixedly connected to the top ends of the walls 3 respectively on either side of the furnace. The rotary firing device 1 is arranged on the crown 2, and the output end of the tubular burner 13 of the rotary firing device 1 is located below the crown 2, that is, the tubular burner 13 injects flame towards the interior of the furnace. Depending on the size of the furnace, the rotary firing devices 1 are arranged on the crown 2 in different quantities and with different patterns. For example, in an embodiment illustrated by FIG. 4, a group of rotary firing devices 1 may be arranged along the width of the furnace; and in other embodiments where a higher width of the furnace is used, two or more groups of rotary combustion devices 1 may be set at intervals along the width of the furnace. In addition, in practical use, two or more groups of rotary firing devices 1 may also be set at intervals along the length of the furnace. The groups of rotary firing devices 1 on the same furnace may be controlled separately, that is, the adjusting arms 12 in the groups of rotary firing devices 1 may control the operation separately.

The furnace according to the solution of the present disclosure utilizes the adjusting arm 12 to drive the tubular burner 13 to rotate or sway, thus enabling a dynamic melting and heating of the glass batch material and molten glass inside the furnace. As a result, the flame coverage expands considerably, the glass batch material is melted more reasonably, more efficiently and at a high rate, and the heat utilization efficiency of the furnace is increased. In addition, a targeted combustion may be specifically directed toward part of batch material which is hard to melt, as well as toward lump material and/or material escaping from being fired, so that the batch line inside the furnace is effectively stabilized, and the melting quality of molten glass is guaranteed.

In the present solution, to further improve the melting efficiency and quality, the furnace also includes an industrial imaging system 4 to capture real-time image data inside the furnace and, based on the captured image data, to adjust the operation of the adjusting arm 12 corresponding to the tubular burner 13 at a specific location to ensure complete melting of the batch and molten glass.

In an optional embodiment, the industrial imaging system 4 includes an industrial imaging device 41, an image transmission device 42, and an industrial computer 43. The industrial imaging device 41 is set on the crown 2 or on the wall 3. The image acquisition end of the industrial imaging device 41 is arranged to face the glass level and/or the wall 3 inside the furnace to capture real-time image data of the glass level and/or the wall 3. The output end of the industrial imaging device 41 is electrically connected to the image transmission device 42, and the output end of the image transmission device 42 is signally connected to the industrial computer 43. The industrial imaging device 41 captures real-time image data inside the furnace, converts the optical signal as captured into an electrical signal, and then transmits the electrical signal to the industrial computer 43 via the image transmission device 42. The industrial computer 43 processes and judges the image, and controls the operation of the adjusting arm 12 based on the judgement result to control the flame coverage of the tubular burner 13.

In an optional embodiment, the industrial imaging device 41 is a high-temperature resistant industrial camera or a thermal imager. The imaging lens of the industrial imaging device 41 is set towards the glass level inside the furnace to capture real-time image data of the glass level inside the furnace.

In an optional embodiment, the output end of the industrial computer 43 is signally connected to the adjusting arm 12. The industrial computer 43 judges the melting state of the batch material in the furnace based on the received image data, and then controls the operating state and operating range of the adjusting arm 12 of each rotary firing device 1 based on the judgement result, so as to control the operation of sway or rotation and the range of such operation for each tubular burner 13. For example, when judging from the image data that there is lump material, or other material that is escaping from being fired, at a specific location, the industrial computer 43 will immediately control the adjusting arm 12 that corresponds to the tubular burner 13 adjacent to the specific location to drive the tubular burner 13 to rotate and/or sway toward this location, so as to carry out a targeted combustion to effectively prevent the occurrence of phenomenon of lump material or material escaping from being fired and ensure the melting quality of molten glass.

Figure 5:
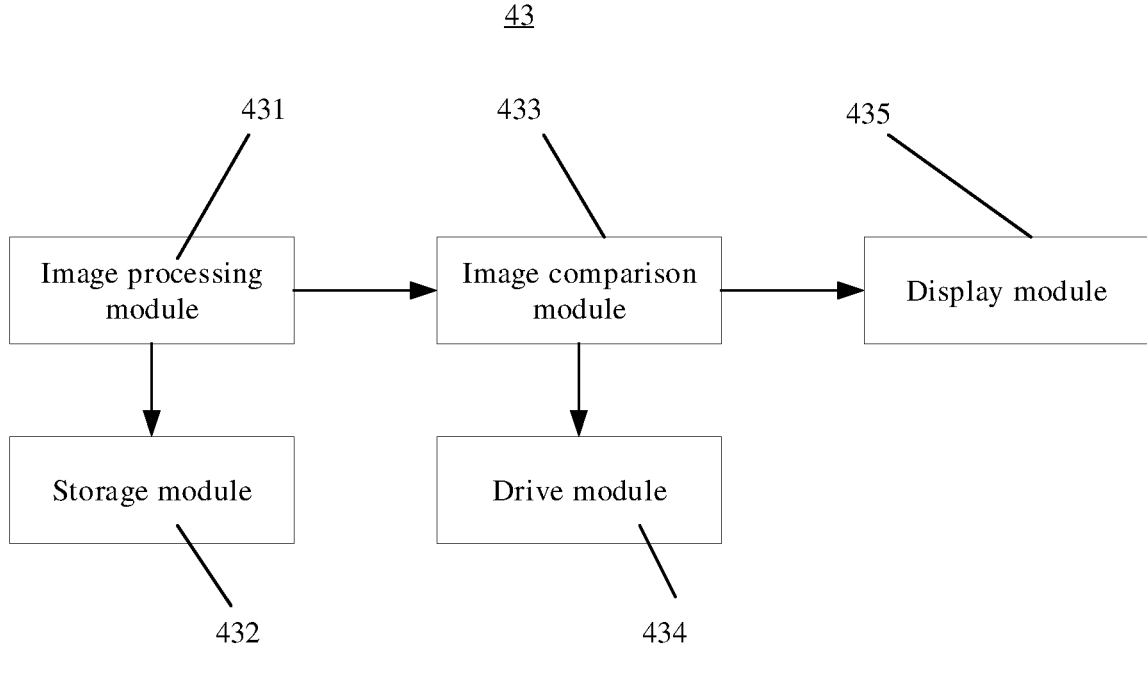
FIG. 5 exemplarily shows a schematic structural diagram of a module of an industrial computer.

FIG. 5 shows a schematic structural diagram of a module of an industrial computer 43 according to an embodiment of the present disclosure. In the embodiment, the industrial computer 43 includes an image processing module 431, a storage module 432, an image comparison module 433, a drive module 434 and a display module 435. The input end of the image processing module 431 is signally connected to the output end of the image transmission device 42, and the output end of the image processing module 431 is signally connected to the storage module 432 and the image comparison module 433. The image processing module 431 receives and processes real-time image data inside the furnace that have been captured by the industrial imaging device 41 and transmitted by the image transmission device 42, then stores the processed image data in the storage module 432, and meanwhile sends the processed image data to the image comparison module 433. The image comparison module 433 compares the processed image data as such with a pre-stored standard image data to determine whether the processed image data show a phenomenon of lump material or material escaping from being fired. For example, the image comparison module 433 may compare and determine whether the data of the molten batch material block or the batch line on the glass level has exceeded a preset range, and display in real time the comparison result on the display module 435. When finding out a phenomenon of escaping material or lump material in the real-time image data after comparison, the image comparison module 433 will determine the location of the escaping material or lump material, and sends the determination result to the drive module 434. The drive module 434 will then drive the adjusting arm 12 that corresponds to the tubular burner 13 adjacent to the location of the escaping material or lump material, so as to control the tubular burner 13 to conduct a targeted combustion toward this location to ensure the melting quality of molten glass.

Further, the present disclosure provides a rotary firing method of a furnace. The rotary firing method is achieved by means of the furnace described above in the present disclosure. With reference to FIG. 4, the rotary firing method according to the solution of the present disclosure comprises the step of:

utilizing the adjusting arm 12 to drive the corresponding tubular burner 13 to rotate conically or to sway to and fro; and in an optional embodiment, the rotary firing method comprises the steps of:

the industrial imaging system 4 capturing real-time image data inside the furnace and, based on the captured image data, driving each of the adjusting arms 12 to drive the operation of the corresponding tubular burner 13.

Figure 6:
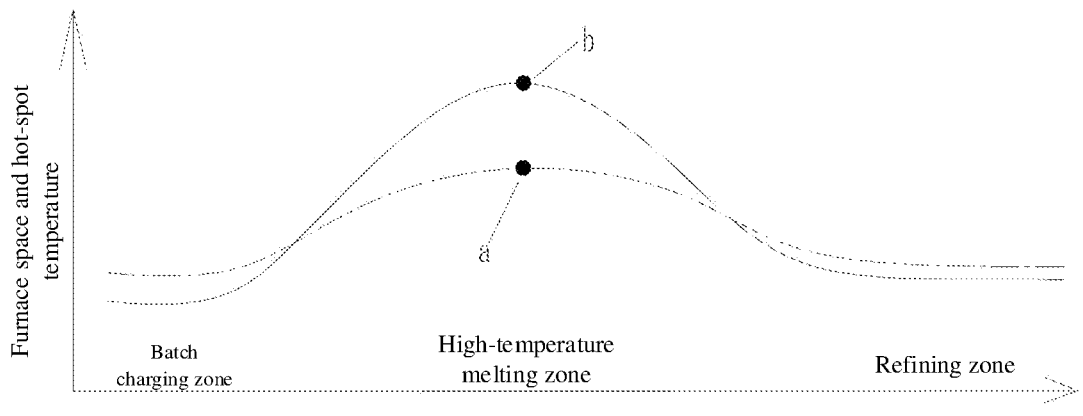
FIG. 6 exemplarily shows a schematic diagram of a temperature profile and a hot-spot temperature inside the furnace of the present disclosure.

It is verified that, for a glass fiber furnace with an annual output of 200,000 tons of product and a melting area of 170 m$^2$, a fast and efficient melting can be achieved with the use of the rotary firing device according to the solution of the present disclosure. The melting rate of the furnace can be up to 3.0~5.0 tons/m$^2$ per day, 20.0%~42.8% up compared with a conventional heating method. In a common melting structure, the hot-spot temperature in a high-temperature melting zone is up to 1600° C.±20° C. (as shown by point b in FIG. 6), whereas by heating with the technical solution according to the embodiment of the present disclosure, the hot-spot temperature in the high-temperature melting zone can be reduced to 1540° C.±40° C. (as shown by point a in FIG. 6), avoiding the impinge on the furnace structure by a local high temperature in the flame space and therefore being more conducive to the safe operation of the furnace.

The examples or embodiments according to the present disclosure are described in a progressive manner. Each embodiment focuses on the differences of this embodiment from other embodiments, and the same and similar parts between embodiments may be referred to each other.

In the description of the present disclosure, reference expressions such as "examples" "exemplary examples", "some embodiments", "exemplary embodiments", and "embodiments" are intended to mean that the particular features, structures, materials or characteristics as described with reference to embodiments or examples are included in at least one embodiment or example of the present disclosure.

In the present description, the schematic representations of the above expressions do not necessarily refer to the same embodiment or example. Further, the particular features, structures, materials or characteristics as described may be combined to one another appropriately in any one or more embodiments or examples.

In the description of the present disclosure, it should be noted that the terms "center", "above", "below", "left", "right", "vertical", "horizontal", "inside", "outside", or any other terms or variants thereof that indicate a directional or positional relation are based on the directional or positional relation shown in the accompanying drawing, and are used merely for facilitating and simplifying the description of the present disclosure rather than indicating or implying that the referenced device or element must have a specific direction or must be formed or operated in a specific direction, and therefore should not be construed as restricting the present disclosure.

It is to be understood that the terms such as "first", "second" and the like used in the present disclosure may be used to describe various structures in the present disclosure, but these structures are not limited by those terms. The terms are merely used to distinguish one structure from another.

In one or more drawings, the same elements are represented by similar reference numerals. For the sake of clarity, many parts in the drawings are not shown to scale. In addition, some commonly known parts may not be shown. For simplicity, a structure obtained after completing several steps may be described in one drawing. Many specific details of the present disclosure, such as the structure, material, size, process and technology of a device, are described below in order to understand the present disclosure more clearly. However, as will be appreciated by one skilled in the art, the present disclosure may be implemented without following those specific details.

Finally, it is to be noted that the foregoing embodiments are merely used for describing the technical solutions of the present disclosure and are not intended to constitute any limitations thereto. While the present disclosure has been described in detail with reference to the foregoing embodiments, it should be understood by one skilled in the art that modifications can be made to the technical solutions recorded in the foregoing embodiments or equivalent replacements can be made to part or all of the technical features thereof, and these modifications or replacements shall not make the essence of the corresponding technical solutions depart from the scope of the technical solutions of the embodiments of the present disclosure.

INDUSTRIAL APPLICABILITY

The rotary firing device, furnace and rotary firing method thereof provided in the embodiments of the present disclosure utilize the adjusting arm and the joint bearing to achieve the adjustment for rotating or swaying the tubular burner, thus enabling a dynamic heating of batch material inside the furnace and increasing the flame coverage of a single tubular burner. By controlling and adjusting the rotation cycle and rotation angle of the tubular burner, the batch material is melted more reasonably, more efficiently and at a high rate, the heat utilization efficiency is increased, and a targeted combustion may be specifically directed toward part of batch material which is hard to melt, as well as toward lump material and/or material escaping from being fired. Therefore, the batch line is effectively stabilized, the melting quality of the furnace is guaranteed, and the melting rate of the furnace is significantly increased.

The invention claimed is:

1. A rotary firing device, being arranged on a roof of a furnace and comprising an installation base, an adjusting arm and a tubular burner, wherein the tubular burner comprises a straight pipe and a bent pipe, and the bent pipe is connected to an upper portion of the straight pipe;

the installation base and the adjusting arm are fixed on the roof of the furnace, a middle portion of the straight pipe is rotationally connected to the installation base, an output end of the straight pipe is located inside the furnace, and an output end of the adjusting arm is connected to the middle portion of the straight pipe;

wherein the adjusting arm is configured to drive the tubular burner to sway in an angle range from 0 to 45° relative to a vertical direction through telescopically driving the tubular burner by a cylinder push rod of a cylinder driver or by a hydraulic rod of a hydraulic drive motor; and a movement trajectory of the tubular burner forms a sector on a vertical plane.

2. The rotary firing device according to claim 1, further comprising a joint bearing, wherein the joint bearing is embedded in the installation base, and the middle portion of the straight pipe is connected to the installation base through the joint bearing.

3. The rotary firing device according to claim 1, wherein the adjusting arm is a multi-joint 6 DOF robotic arm.

4. A furnace comprising a crown, a wall and at least one set of at least one of the rotary firing devices according to claim 1, wherein an edge of the crown is fixed to a top of the wall, the each of the at least one of the rotary firing devices is arranged on the crown, and the output end of the straight pipe is located below the crown.

5. The furnace according to claim 4, further comprising an industrial imaging system for capturing real-time image data inside the furnace.

6. The furnace according to claim 5, wherein the industrial imaging system comprises an industrial imaging device, an image transmission device, and an industrial computer, the industrial imaging device is set on the crown or on the wall, an image acquisition end of the industrial imaging device is arranged to face at least one of a glass level or the wall inside the furnace, and an output end of the industrial imaging device is electrically connected to the image transmission device, and an output end of the image transmission device is signally connected to the industrial computer.

7. The furnace according to claim 6, wherein the industrial imaging device is a high-temperature resistant industrial camera or a thermal imager.

8. The furnace according to claim 6, wherein an output end of the industrial computer is signally connected to the adjusting arm.

9. The furnace according to claim 6, wherein the industrial computer comprises an image processing module, a storage module, an image comparison module, a drive module and a display module, an input end of the image processing module is signally connected to the output end of the image transmission device, an output end of the image processing module is signally connected to the storage module and the image comparison module, and an output end of the image comparison module is signally connected to the drive module and the display module.

* * * * *